(12) United States Patent
Ott et al.

(10) Patent No.: US 6,406,065 B1
(45) Date of Patent: Jun. 18, 2002

(54) ROTARY JOINT FOR ALTERNATING MEDIA

(75) Inventors: Stephan Ott, Wiesbaden; Norbert Mittermeier, Hattersheim, both of (DE)

(73) Assignee: GAT Gesellschaft fur Antriebstechnik mbH, Wiesbaden (DE)

( * ) Notice: Subject to any disclaimer, the term of this patent is extended or adjusted under 35 U.S.C. 154(b) by 0 days.

(21) Appl. No.: 09/612,037

(22) Filed: Jul. 7, 2000

(30) Foreign Application Priority Data

Jul. 10, 1999 (DE) .......................................... 199 32 355

(51) Int. Cl.⁷ ................................................ F16L 21/00
(52) U.S. Cl. ................................ 285/120.1; 280/121.6; 280/98; 137/580
(58) Field of Search .......................... 285/120.1, 121.6, 285/121.1, 121.3, 190, 94, 98, 281, 279, 41; 137/580

(56) References Cited

U.S. PATENT DOCUMENTS

| | | | | |
|---|---|---|---|---|
| 2,626,166 A | * | 1/1953 | Fawick | 285/22 |
| 2,727,760 A | * | 12/1955 | Fawick | 285/96.1 |
| 3,694,008 A | * | 9/1972 | Slator et al. | 285/94 |
| 3,804,424 A | | 4/1974 | Gardner | 277/27 |
| 3,889,983 A | * | 6/1975 | Freize et al. | 285/13 |
| 4,577,892 A | * | 3/1986 | Wriilich et al. | 285/136 |
| 4,848,400 A | * | 7/1989 | Grant et al. | 137/580 |
| 4,976,282 A | * | 12/1990 | Kubala | 137/580 |
| 5,226,677 A | * | 7/1993 | Peter et al. | 285/11 |
| 5,439,029 A | * | 8/1995 | Becker | 137/580 |
| 5,538,292 A | * | 7/1996 | Sommer | 285/13 |
| 5,651,567 A | * | 7/1997 | Kaleniecki et al. | 285/121.3 |
| 5,669,636 A | * | 9/1997 | Kubala | 285/98 |
| 6,109,659 A | * | 8/2000 | Heidenreich et al. | 285/13 |
| 6,164,316 A | * | 12/2000 | Betti | 137/338 |
| 6,203,072 B1 | * | 3/2001 | Berghuis et al. | 285/24 |

FOREIGN PATENT DOCUMENTS

| | | | |
|---|---|---|---|
| DE | 23 20 681 | 4/1977 | |
| DE | 19630929 A1 | * 2/1997 | 285/98 |
| JP | 08026151 | 1/1996 | |
| JP | 08026152 | 1/1996 | |

* cited by examiner

Primary Examiner—J. J. Swann
Assistant Examiner—J. Allen Shriver
(74) Attorney, Agent, or Firm—Paul & Paul

(57) ABSTRACT

The present invention relates to a rotary joint for alternating passage of a lubricating medium and a non-lubricating medium from a stationary (3) to a rotating machine part (1), having a first seal (7) in the form of two flat, substantially circular ring-shaped sliding sealing surfaces (4, 6) arranged so as to slide one on the other, which sealing surfaces (4, 6) are substantially concentric relative to the axis of rotation (10) of the rotating machine part (1) and may be moved at least far enough from one another, in the axial direction, that they do not come into contact with each other during rotation of the rotating machine part (1). To provide a rotary joint of the above-mentioned type, which, despite so-called dry run safety, nonetheless exhibits only slight leakage losses even during passage of a non-lubricating medium and even when the rotating machine part rotates at high speeds, it is proposed according to the invention that an additional cylindrical seal (17) be provided, the sealing surfaces of which are formed of cylindrical circumferential surfaces (14, 16) arranged concentrically relative to one another with a narrow sealing gap, the cylindrical seal (17) being arranged in the direction of leakage flow between the flow passage (20) of the rotary joint and the first seal (7).

12 Claims, 3 Drawing Sheets

Figure 1:
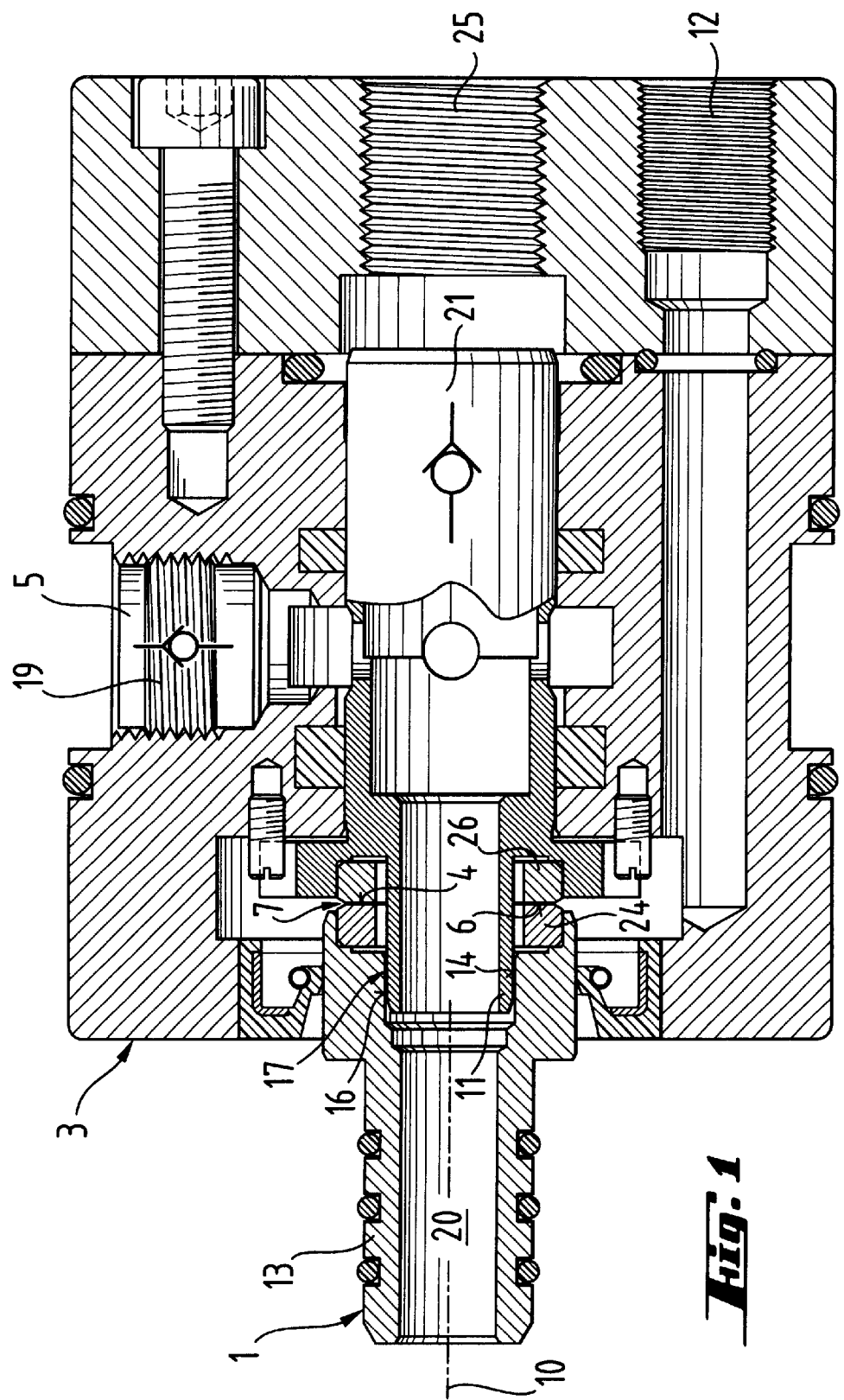

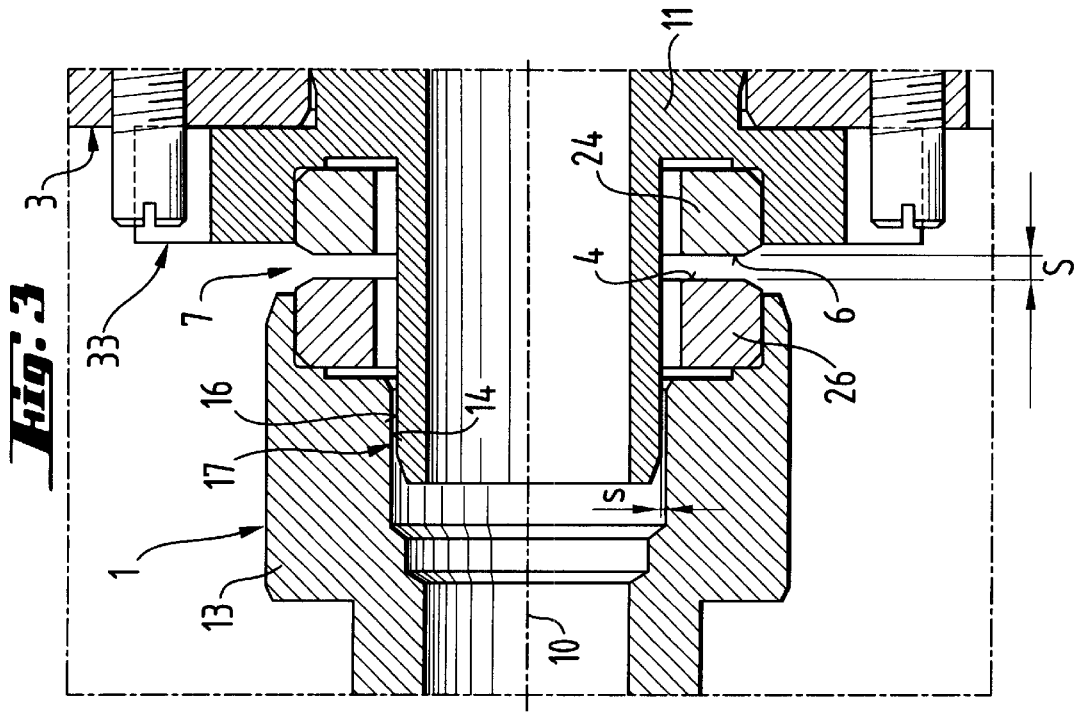
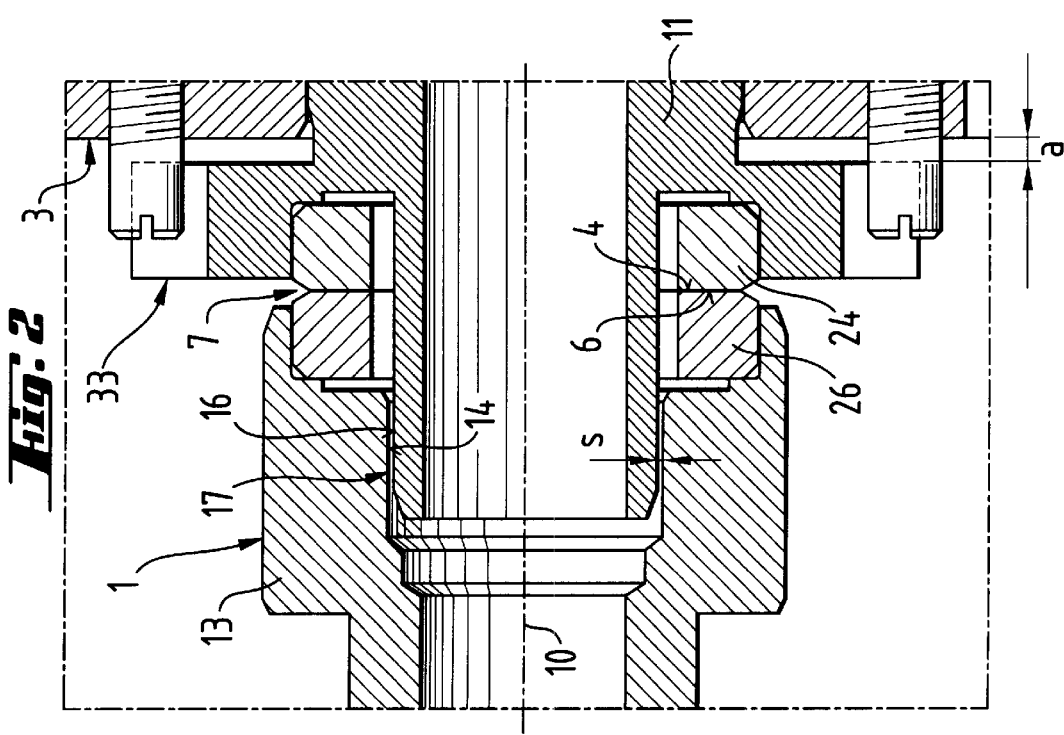

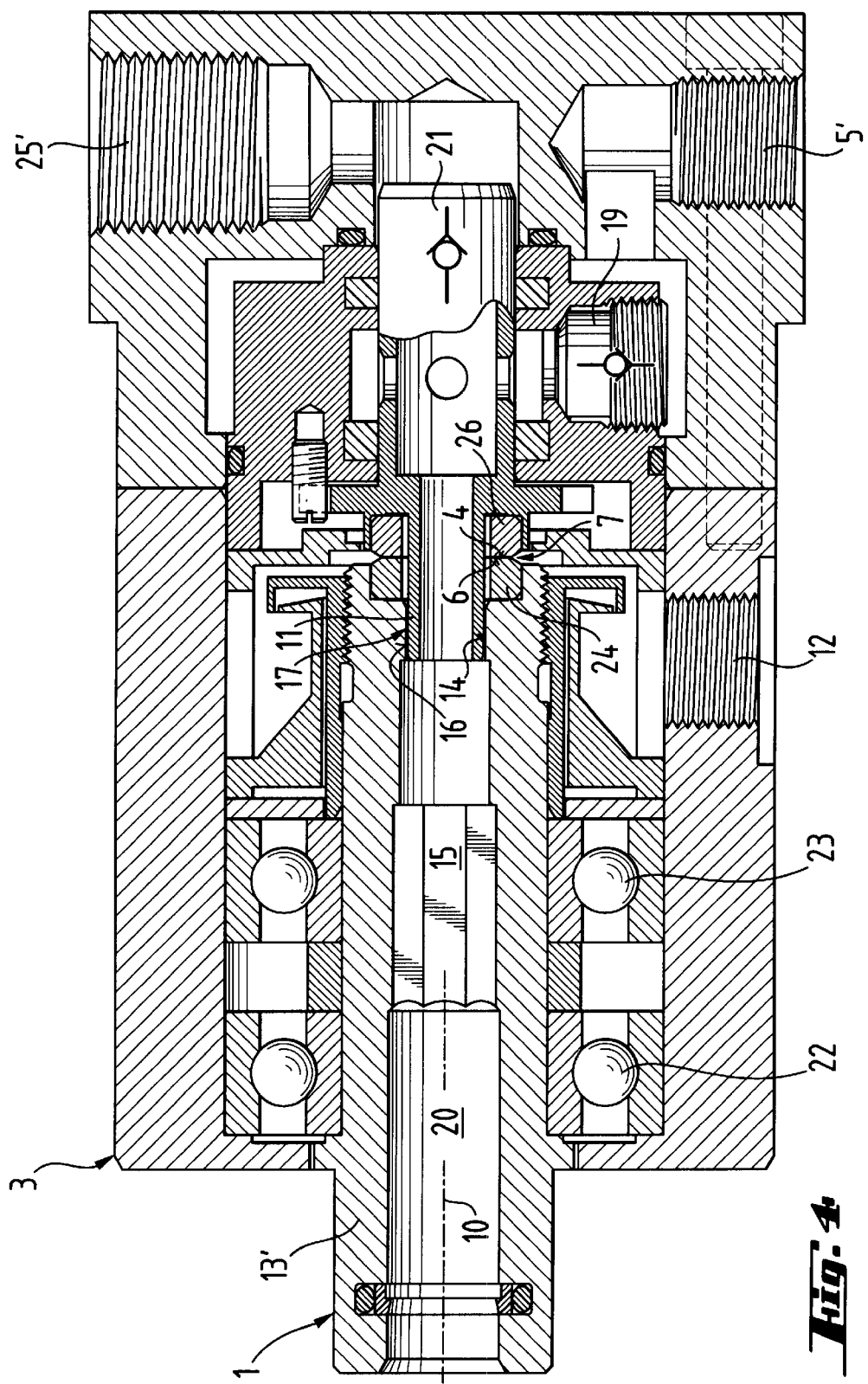

ROTARY JOINT FOR ALTERNATING MEDIA

The present invention relates to a rotary joint for alternating passage of a lubricating medium and a non-lubricating medium from a stationary to a rotating machine part, having a first seal in the form of two flat, substantially circular ring-shaped sliding sealing surfaces arranged so as to slide one on the other, which sealing surfaces are substantially concentric relative to the axis of rotation of the rotating machine part and may be moved at least far enough from one another, in the axial direction, that they do not come into contact with each other during relative rotation of the rotating machine part.

Such rotary joints, which are also known as "dry run-safe rotary joints", are already known. If a lubricating medium is supplied, the two flat sliding sealing surfaces are brought into contact with each other, the lubricating medium forming a lubricating film between the sealing surfaces sliding one on the other, such that it is ensured in this way that excessive frictional heat does not arise even at high rotational speeds, which could otherwise lead very rapidly to destruction of the sliding sealing surfaces.

However, the sliding sealing surfaces have to be moved apart in the axial direction If the rotating machine part rotates at a certain rotational speed without the lubricating medium being fed thereto. In this case no lubricating film can form between the sliding sealing surfaces and the dry sliding sealing surfaces, which are generally made of a ceramic material, very rapidly become hot and may be destroyed thereby, even if the rotational speed of the rotating machine part is comparatively low and way below the maximum rotational speed at which the seal is designed to operate when lubricating medium is supplied.

Dry run safety is thus achieved in that the two flat sliding sealing surfaces are moved a short distance away from one another, the increasing sealing gap having in any case to be large enough to ensure that the sliding sealing surfaces do not come into contact during the period without lubricating medium even taking account of the tolerances which may be exhibited by all the components of the device.

A series of applications exists in which another medium, without lubricating properties, has also to be supplied during rotation of the rotating machine part. For example, a water/oil emulsion may be supplied to a machine tool as coolant and lubricant during a first operating phase through a hollow spindle, the one end of which is connected to the rotating part of the rotary joint or constitutes this rotating part, whilst, during another operating phase, compressed air may be supplied for example for blowing through a drilled hole or blowing clean the working area or a tool, while the tool continues to turn.

The deliberate enlargement of the sealing gap for the purpose of protecting the sliding sealing surfaces during supply of this non-lubricating medium has the disadvantage, however, that compressed air may escape through this sealing gap in very considerable quantities, which leads not only to a drop in pressure and thus to reduced efficiency of the compressed air supplied to an operating point but additionally to a considerable loss of energy.

Taking this prior art as basis, the object of the present invention is to provide a rotary joint of the above-mentioned type which, despite its so-called dry run safety, nonetheless exhibits only small leakage losses even during passage of a non-lubricating medium and even when the rotating machine part is operating at high rotational speeds.

This object is achieved in that, in addition to the first flat seal, an additional cylindrical seal is provided, the sealing surfaces of which are formed of cylindrical circumferential surfaces arranged concentrically relative to one another with a narrow sealing gap, the cylindrical seal being arranged in the direction of potential leakage flow between the flow passage of the rotary joint and the first seal.

The above-mentioned features ensure that the non-lubricating medium has to pass through the seal formed by cylindrical circumferential surfaces and the narrow sealing gap formed therebetween before it can pass at all through the enlarged axial gap of the flat seal, which narrow sealing gap may be kept substantially narrower and smaller than the axial gap between the flat sliding sealing surfaces in the event of feed of a non-lubricating medium.

The cylindrical sealing surfaces may therefore be made with substantially tighter, smaller tolerances, because very tight tolerances may be observed in the case of cylindrical surfaces having appropriately small diameters. In contrast, the axial distance between flat sliding sealing surfaces is influenced by all the components connected therewith, which may be relatively long, such that a substantially greater safety gap has to be established at the axial surfaces, in order to make the rotary joint dry run safe. In addition, any case in the preferred embodiment of the invention, the radius of the cylindrical circumferential surfaces is smaller than the Internal diameter of the flat, annular sliding sealing surfaces of the first seal. Because of the small radius of these cylindrical circumferential surfaces, the relative speeds between the mutually opposing sealing surfaces are also lower and only relatively little frictional heat therefore arises even in the case of slight contact.

In this way, it may be ensured that even a medium with very low viscosity, such as compressed air for example, may be conveyed through the rotary joint with a very low leakage rate, even if the rotating machine part rotates at high speeds of, for example, 20,000 revolutions/minute relative to the stationary machine part.

If the lubricating medium is supplied, said medium naturally also penetrates into the narrow radial sealing gap between the cylindrical sealing surfaces and thence also into the axial gap between the flat sliding sealing surfaces, wherein, in this case however, the sliding surfaces are pressed together and thus reduce the sealing gap virtually to the thickness of the lubricating film produced by the lubricating medium.

The outer cylindrical circumferential surface of the second seal is appropriately connected to the rotating machine part, while the inner cylindrical circumferential surface of the second seal is connected to the stationary machine part. It goes without saying that the reverse arrangement is in principle also possible.

In any case, however, it is appropriate for the cylindrical sealing surfaces to be so arranged that the inner cylindrical circumferential surface overlaps the area of he first flat seal in the axial direction. In other words, the inner cylindrical circumferential surface, located on a sleeve, is connected either to the stationary or to the rotating machine part and the seal with the flat sealing surfaces comprises this sleeve, wherein each of the flat sealing surfaces is respectively connected with the stationary machine part or the rotating machine part. The part of this sleeve or cylindrical wall projecting beyond the first flat seal in the axial direction forms the inner or outer sealing surface of the second seal.

It is also appropriate for the flat sealing surfaces to be resiliently prestressed against each other. This means that the flat sliding sealing surfaces normally contact each other with a well-defined contact pressure, such that the rotary joint is designed for the supply of a lubricating medium, while, for the supply of non-lubricating media, the sliding sealing surfaces have to be moved apart in the axial direction against the spring force. In many instances of application this is the shorter working cycle.

The respective sealing surfaces or the parts directly or indirectly carrying these sealing surfaces are preferably so designed that the flat sealing surfaces may be moved apart to an axial sealing gap width which is at least ten times the radial sealing gap width between the cylindrical circumferential surfaces of the second seal.

Conversely, it could also be said that the radial sealing gap width of the cylindrical circumferential surfaces amounts to at most a tenth of the necessary axial minimum gap width of the first seal, which has to be established for dry run safety, in any case for continuous running. Taking account of the smaller radius of the cylindrical circumferential surfaces compared with the flat sliding sealing surfaces and taking account of the axial flow path along the cylindrical sealing surfaces compared with the radial flow path between the flat sliding sealing surfaces, the above-mentioned construction ensures that the leakage rate is in the construction according to the invention is reduced by at least the factor 100 compared with merely providing the flat seal with an enlarged sealing gap for dry run safety.

A preferred embodiment of the invention has rolling bearings incorporated into the rotary joint and a hollow shaft which is arranged rotatably in the rolling bearings and connected integrally with the outer cylindrical circumferential surface.

In this embodiment, particularly exact guidance of the cylindrical sealing surfaces may be achieved, such that the latter may be produced with particularly tight tolerances, it thus being possible to make the radial sealing gap particularly narrow.

As far as the flat sliding sealing surfaces are concerned, an embodiment of the invention is preferred in which these sliding sealing surfaces are arranged on sliding sealing rings, which may be connected in firm, leakproof manner to the stationary or rotating machine part respectively.

Since the sliding sealing surfaces are frequently made of a special material, for example ceramics, this arrangement the sliding sealing surfaces on separate rings, which may however be connected in firm and leakproof manner with the associated parts, is particularly expedient.

Furthermore, in a convenient embodiment of the invention either the inner or the outer cylindrical surface of the second seal is mounted so as to be resiliently elastic in the radial direction. In this way, slight tolerance variations and circularity errors exhibited by the mutually opposing sealing surfaces may be easily compensated, without resulting in excessive or significant friction and wear to the cylindrical surfaces.

For a gaseous or non-lubricating medium, it is expedient to provide a radial feed opening on the rotary joint according to the invention, while, for the lubricating medium, an axial feed opening is provided centrally at one end of the rotary joint, these positions being reversible without difficulty, however.

So that supply of the media may be effected independently and without mutual interference, the preferred embodiment of the invention in this case additionally provides for the feed opening for gas or another non-lubricating medium and also the feed opening for the lubricating medium to be secured in each case by non-return valves respectively against outflow of this or the other medium counter to the feed direction.

It is additionally expedient for the lubricating medium to be supplied axially and the non-lubricating medium to be supplied radially to a bushing, which is mounted not rotatably but axially displaceably in the stationary machine part and which carries the stationary machine part sealing surfaces of both the first and second seal. In this embodiment, pressure is exerted on the axially movable sleeve in the case of axial feed of the lubricating medium, whereby the non-return valve provided on said bushing opens and the bushing is pressed in the axial direction with its flat sliding sealing surface against the sliding sealing surface of the rotating machine part, such that, when the lubricating medium is supplied, the desired narrow sealing gap is automatically established. If supply of the lubricating medium is stopped, such that the pressure on the bushing in the axial direction eases and the non-lubricating medium is fed through the radial feed opening in the bushing instead, the pressure thereof not only opens the second non-return valve but also acts axially on the first non-return valve in the opposite direction from the lubricating medium, whereby the bushing is moved axially back and the two flat sliding sealing surfaces are thereby moved apart. In this way, the desired position of the sealing surfaces is established automatically by the alternating supply of lubricating and non-lubricating media.

If, however, the rotary joint is also to be used without feed of either of the two media, the bushing, carrying the sliding sealing surfaces, of the stationary machine part may also be prestressed by a spring against the compressive force of the lubricating medium, such that in the normal situation, in the absence of feed of the lubricating medium, the flat sliding sealing surfaces 4, 6 are moved apart and are not in contact with one another.

Other advantages, features and possible uses of the present invention will become clear from the following description of a preferred embodiment and the associated Figures, in which:

FIG. 1 is an axial longitudinal section through a rotary joint according to the invention and FIG. 2 is an enlarged portion of the areas carrying the sealing surfaces in the event of feed of a lubricating medium, FIG. 3 shows the same portion as FIG. 2, but with feed of a non-lubricating medium and FIG. 4 is a section similar to FIG. 1, but through a different embodiment with its own rolling bearings.

FIG. 1 shows a housing 3 of a rotary joint, which corresponds to a stationary machine part or is connected to such a component. It additionally shows a rotatable machine part 1 having a hollow shaft 13 with a passage 20. The passage 20 may be selectively connected with a radial feed opening 5 or an axial feed opening 25, which are secured by non-return valves 19 or 21 against backwards flow and in particular against backwards flow of the other medium.

The two machine parts 3 and 1 rotating relative to one another are connected together via a first, radial seal 7 and a second, axial seal 17. The radial seal 7 is formed of two sliding disks or sliding rings 24, 26 with sliding sealing surfaces 4, 6, which lie in a radial plane of the rotary joint.

Reference numeral 25 designates an axial inlet opening for a lubricating medium. A non-return valve 21 is located downstream of the inlet opening 25 in the direction of flow, which non-return valve 21 is opened by the pressure with which the lubricating medium is introduced into the rotary joint. At the same time, the sleeve 11 is moved in the axial direction (to the left in the Figures shown) by the pressure acting on the non-return valve 21 and the ends and stepped portions of the sleeve 11, such that the sealing gap 7 between the sealing surfaces 4 and 6 closes, wherein, as shown in FIG. 2, the stop flange 33 of the sleeve 11 is moved away from the corresponding stop flange on the housing by a gap a. As may be seen, the flange 33 is secured against rotation to the stationary housing or machine part 3 by securing screws.

The lubricating medium may then flow through the central passage hole 20 in the direction of a point of use. Through the pressure prevailing in the lubricating medium, the non-return valve 19 in the feed opening for another, the non-lubricating medium is simultaneously kept closed. The lubricating medium may additionally pass through the radial sealing gap, which is formed between the cylindrical surfaces 14 and 16 and finally penetrates into the gap between the sliding sealing surfaces 4 and 6, in order there to form a lubricating film which, however, at the same time also a sealing effect. A leakage space surrounds the sliding sealing rings 24, 26, such that the outgoing medium may be collected therein and drained via the leakage connection 12 shown in FIG. 2 only. The outgoing leakage amounts are very slight, however, owing to this construction on the seals.

If feed of the lubricating medium is to be stopped, the pressure of this medium at the inlet opening 25 is reduced to such an extent that the non-return valve 21 closes. Another medium, for example compressed air, may then be supplied through the radial feed opening 5. Once the quantity of lubricating medium remaining in the passage 20 has firstly been forced out by the incoming compressed air, compressed air is then conveyed through the passage 20. Through the pressure of the non-lubricating medium, which is fed radically into the sleeve 11 or a sleeve connected firmly therewith and carrying the non-return valve 21, the non-return valve 21 is subjected to pressure in the opposite direction from the supply of lubricating medium, such that the sleeve 11 moves back in axial direction (to the right in the Figures shown) and into a position as shown on an enlarged scale in FIG. 3. The gap a between the flange 33 and the stationary housing 3 closes and instead thereof a corresponding gap S opens up between the sliding sealing surfaces 4 and 6. The sliding sealing surfaces 4,6, are then at a small albeit clear distance from one another, which is typically ten to fifteen times larger that the radial distance S between the surfaces 14, 16. In addition, the non-return valve 21 is held closed by the pressure of the compressed air, while at the same time the valve 19 is open as a result of this pressure. This compressed air may escape by the same leakage path as the lubricating medium before it, wherein in this case, however, the axial gap S between the sliding sealing surfaces 4 and 6 is substantially larger. However, the narrow radial gap between the cylindrical circumferential surfaces 14 and 16 provides sufficient flow resistance to keep the loss of compressed air sufficiently slight and orders of magnitude lower than this loss would be if the compressed air could escape directly through the axial gap between the surfaces 4 and 6.

The radial sealing surface 16 is located on a hollow-cylindrical extension of a sleeve 11, which is inserted into the housing 3 of the rotary joint in leakproof manner and, as mentioned above, so as to be axially movable.

The cylindrical circumferential surface 14 is located at one end inside the bore in the hollow shaft 13 forming the passage 20 and concentrically relative to this bore. Besides, the hollow shaft 13 may also be mounted in axially movable manner, however, optionally between axial end stops, in order thereby to be able to actuate a chucking device or the like. The other components illustrated serve essentially merely to provide the simplest possible production and assembly and do not need to be explained further here.

FIG. 4 shows an embodiment of the invention, which in many ways is identical to the embodiment according to FIG. 1, but does exhibit some differences. For example, the central connection 25 at the rear end of the housing extends in the radial direction at the rear end of the housing, even though ultimately feed of this medium proceeds axially and centrally. The main difference in comparison with the embodiment according to FIG. 1 lies, however, in the fact that the hollow shaft 13' is held in the housing 3' by a ball bearing system. In this way, even better guidance of the hollow shaft is possible, this guidance being above all very close to the cylindrical sealing surfaces 14, 16 and the bearing 22, 23 being incorporated into the same housing in which the sealing surfaces 16 is fixed. In this way, the cylindrical circumferential surfaces 14, 16 may be produced with even tighter tolerances and yet smaller leakage losses are accordingly achieved for the non-lubricating medium.

Reference numeral 15 designates a hexagon socket inside the bore of the hollow shaft 13', which socket drives, in a manner fixed for rotation, an axially displaceable tension rod accommodated in the hollow shaft. A more or less resilient mounting of one of the sealing surfaces in the radial direction is not shown in the Figures or is shown only to an extent, whereby a degree of compensation of the tolerance variation of the circularity of the surfaces 14, 16 may be achieved.

What is claimed is:

1. A rotary joint for alternating passage of a lubricating medium and a non-lubricating medium from a stationary (3) to a rotating machine part (1), having a first seal (7) in the form of two flat, substantially circular ring-shaped sliding sealing surfaces (4,6) arranged so as to slide one on the other, which sealing surfaces (4,6) are substantially concentric relative to the axis of rotation (10) of the rotating machine part (1) and may be moved at least far enough from one another, in the axial direction, that they do not come into contact with each other during rotation of the rotating machine part (1), characterized in that an additional cylindrical seal (17) is provided, the sealing surfaces of which are formed of cylindrical circumferential surfaces (14,16) wherein a first sealing surface (16) is located on a non-rotating sleeve (11) attached to said stationary machine part (3) and a second sealing surface (14) is located on said rotating machine part (1) are arranged with a tight tolerance fit concentrically relative to one another with a narrow sealing gap to form a lubricating film seal, the cylindrical seal (17) being arranged in the direction of leakage flow between the flow passage (20) of the rotary joint and the first seal (7), wherein a series flow from said second seal (17) is established to said first seal (7).

2. A rotary joint according to claim 1, characterised in that the annular sliding sealing surfaces (4, 6) have an internal diameter which is larger than the diameter of the cylindrical circumferential surfaces (14, 16) of the second seal (17).

3. A rotary joint according to claim 1 or claim 2, characterised in that the outer cylindrical circumferential surface (14) is connected with the rotating machine part (1) and the inner cylindrical circumferential surface (16) is connected with the stationary machine part (3).

4. A rotary joint according to one of claims 1 to 2, characterised in that the inner cylindrical circumferential surface (16) overlaps the area of the first flat seal (7) in the axial direction.

5. A rotary joint according to one of claims 1 to 2, characterised in that the flat sealing surfaces (4, 6) are resiliently prestressed against each other.

6. A rotary joint according to one of claims 1 to 2, characterised in that the flat sealing surfaces (4, 6) may be moved away from one another to form an axial sealing gap width which amounts to at least ten times the radial sealing gap width between the cylindrical circumferential surfaces (14, 16).

7. A rotary joint according to one of claims 1 to 2, characterised in that it comprises integral rolling bearings (22, 23) and a hollow shaft (13) accommodated rotatably in the rolling bearings, which hollow shaft (13) is connected integrally with the outer cylindrical circumferential surface (14).

8. A rotary joint according to one of claims 1 to 2, characterised in that the flat sliding sealing surfaces (4, 6) are each arranged on sliding sealing rings (24, 26) which may be connected firmly and in leakproof manner with the stationary and the rotating machine part respectively (3, 1).

9. A rotary joint according to one of claims 1 to 2, characterised in that the inner or the outer cylindrical circumferential surface (14, 16) is mounted so as to be elastically resilient in the radial direction.

10. A rotary joint according to one of claims 1 to 2, characterised in that a radial feed opening (5) for gaseous or non-lubricating medium and an axial feed opening (25) for a lubricating medium are provided in a rotary joint housing firmly connected with the stationary machine part (3).

11. A rotary joint according to claim 10, characterized in that at least one of said feed opening (5) for gas or non-lubricating medium or the feed opening (25) for a lubricating medium is secured by a non-return valves (19, 21) against outflow of the restrictive medium.

12. A rotary joint according to one of claims 1 to 2, characterised in that the sealing surfaces (6, 16) of the stationary machine part are arranged on a sleeve (11) mounted in axially movable manner, which sleeve (11) also carries the non-return valve (21) for the axially fed, lubricating medium, while the non-lubricating medium is fed through a radial opening, which discharges between the non-return valve and the sealing surfaces (6, 16).

* * * * *